US012539722B1

(12) United States Patent
Howard

(10) Patent No.: US 12,539,722 B1
(45) Date of Patent: Feb. 3, 2026

(54) UTILITY ROPE AND METHOD THEREOF

(71) Applicant: FUSION TOOLS, INC., Gallatin, TN (US)

(72) Inventor: West Howard, Gallatin, TN (US)

(73) Assignee: FUSION TOOLS, INC., Gallatin, TN (US)

( * ) Notice: Subject to any disclaimer, the term of this patent is extended or adjusted under 35 U.S.C. 154(b) by 910 days.

(21) Appl. No.: 17/836,326

(22) Filed: Jun. 9, 2022

(51) Int. Cl.
*B60D 1/18* (2006.01)
*B66C 1/18* (2006.01)
*D07B 1/14* (2006.01)

(52) U.S. Cl.
CPC .................. *B60D 1/18* (2013.01); *B66C 1/18* (2013.01); *D07B 1/14* (2013.01); *D07B 2201/1096* (2013.01); *D07B 2501/2015* (2013.01)

(58) Field of Classification Search
None
See application file for complete search history.

(56) References Cited

U.S. PATENT DOCUMENTS 1,168,802 A * 1/1916 Harrison .................. B66C 1/18 294/74
1,931,808 A * 10/1933 Andersen .................. B66C 1/12 294/152
2,435,088 A * 1/1948 Mazzella .................. B66C 1/12 87/8
3,740,087 A * 6/1973 Back .................. B66C 1/18 206/527
5,018,775 A * 5/1991 McKenna .................. D07B 1/18 294/82.11
5,829,374 A * 11/1998 Hede .................. D07B 1/185 112/475.08
9,145,639 B2 * 9/2015 Vandrovcova .................. D07B 1/185
2014/0070557 A1 * 3/2014 Mozsgai .................. B66C 1/12 29/428
2017/0353017 A1 * 12/2017 Ward .................. D07B 1/18
2022/0178074 A1 * 6/2022 Pavel .................. B66C 1/122
2022/0307196 A1 * 9/2022 Nicholson .................. F16G 11/103
2025/0162360 A1 * 5/2025 Yu .................. B60D 1/18

* cited by examiner

*Primary Examiner* — William A. Rivera
(74) *Attorney, Agent, or Firm* — Nathan I. North; Patterson Intellectual Property Law, PC

(57) ABSTRACT

A utility rope apparatus and a method of coupling first and second rope portions of the utility rope apparatus together is disclosed herein. The utility rope apparatus may include a rope, a main loop binding, a first end binding, and a second end binding. The rope may include a first end, a second end, and a length. The main loop binding may be to couple the first and second ends of the rope together to define a main loop of the rope. The first end binding may be coupled to the main loop of the rope to define a first end loop subdivided from the main loop. The second end binding may be coupled to the main loop of the rope to define a second end loop subdivided from the main loop and offset from the first end loop by about one-half of the length of the rope.

19 Claims, 10 Drawing Sheets

UTILITY ROPE AND METHOD THEREOF

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present invention relates generally to the pulling and/or lifting of objects. More particularly, this disclosure pertains to recovery ropes, tow ropes, and lifting ropes, such as slings.

2. Description of the Prior Art

Certain recovery, tow, and lifting ropes are made out of ropes, such as, for example, double braided nylon ropes. These ropes generally have a spliced loop at each end to allow the connection of the rope between two objects, such as, for example, two vehicles, a crane and an object, or the like.

In the case of recovery ropes, the end loops may allow the rope to be connected between a stuck vehicle and a vehicle that will pull the stuck vehicle. Under load, a recovery rope may stretch up to 30% and then transfer the immense amount of energy from the towing vehicle to free the struck vehicle. Recovery ropes are designed to be the most effective recovery method for reducing shock and strain to both vehicles. By design, recovery ropes do not have to be tensioned before pulling the stuck vehicle. With traditional methods, the towing vehicle must gain tension on the tow strap or chain before initiating the recovery. If not, a damaging stock may be transferred to both vehicles. In this situation, traditional tow straps or chains can also break creating a hazardous environment.

A recovery rope may be sized based on required loads, such as, for example, the size of the vehicle in need of recovery. For example, a two-inch (2") recovery rope may pull a fully loaded semitruck.

Generally, almost all recovery ropes are made of a double braided nylon rope with spliced eyes on each end. The eyes allow the connection of the rope between the stuck vehicle and the recovery vehicle. Due to the manufacturing process, the "eyes" have about double the amount of rope (e.g., thickness) and double the strength of the rest of the rope. This creates unnecessary material, cost and weight on the ends of the rope for an increase in strength than is not imparted to the remainder of the rope. There is about 30% unnecessary weight to all recovery ropes. The only way to increase the strength of the recovery rope is to use a larger diameter rope, which requires dedicated inventory and ties-up inventory dollars. In addition, fewer manufacturers make large diameter ropes (e.g., larger than 1" diameter). Due to the decreased supplier base, there is an associated premium cost for large diameter ropes.

In terms of manufacturing inefficiencies, creating two splices (e.g., one at each end) is time consuming, increases labor costs, and decreases production rates. Ropes may need to have the ends of the eyes dipped into a rubber coating or a protective sleeve installed thereon to provide abrasion protection. The rubber (e.g., poxy) coating creates noxious fumes and may create a hazardous work environment. The sleeves must be sized to each size rope. Large diameter sleeves are expensive and can be difficult to work in while creating splices ate each end. To complete each splice, each eye needs to have the ends whipped to keep the splice in place. This is a time-consuming process and takes up a lot of twine when working with large diameter ropes.

While only discussed in terms of recovery ropes, these problems and the solutions provided below may be equally applicable to tow ropes and lifting ropes.

BRIEF SUMMARY

In view of at least some of the above-referenced problems in conventional recovery ropes, an exemplary object of the present disclosure may be to provide a new and improved utility rope apparatus useful for recovery, towing, and/or lifting. The new utility rope apparatus, as disclosed herein, may be constructed of a double braided rope made into one large loop. This creates a product that achieves the same result or strength as a large diameter rope using two strands of a smaller diameter rope. This allows the product to be made with one splice or sewn connection between the two ends of the rope to form the one large loop. The overall weight of the utility rope apparatus is decreased by about 30% relative to a larger diameter rope having a similar strength. This reduces the amount of wasted material used to form two splices. It also reduces the material needed to create the splice, as more material is used to splice larger diameter rope than smaller diameters.

An exemplary such apparatus may desirably be organized to form multiple loops for greater strength while using only one spliced or sewn connection. This may enable the production of a recovery rope of unlimited strength just by increasing the number of loops made with the rope. Doubling the rope (e.g., looping it between objects) may be like using a laminated design (i.e., the strength achieved is greater than the rated sum of the two strands.

In a particular embodiment, an exemplary utility rope apparatus as disclosed herein may be configured to be coupled between first and second objects for pulling or lifting. The utility rope apparatus may include a rope, a main loop binding, a first end binding, and a second end binding. The rope may have a first end, a second end, and a length defined between the first and second ends. The main look binding may be configured to couple the first and second ends of the rope together to define a main loop of the rope. The first end binding may be coupled to the main loop of the rope to define a first end loop. The first end loop may be subdivided from the main loop. The second end binding may be coupled to the main loop of the rope to define a second end loop. The second end loop may be subdivided from the main loop and may further be offset from the first end loop by about one-half of the length of the rope.

In an exemplary aspect according to the above-referenced embodiment, the main loop binding may comprise a spliced connection defined by splicing the first and second ends of the rope together.

In another exemplary aspect according to the above-referenced embodiment, the first and second ends of the rope may be overlapped by an overlap length. In accordance with this aspect, the main loop binding may be defined by a sewn connection between the first and second ends of the rope extending along a majority of the overlap length.

In another exemplary aspect according to the above-referenced embodiment, the sewn connection may comprise a zig-zag stitch.

In another exemplary aspect according to the above-referenced embodiment, the zig-zag stitch may include a total sewn length greater than or equal to 8 times a diameter of the rope.

In another exemplary aspect according to the above-referenced embodiment, the zig-zag stitch may include a sewn width greater than or equal to a diameter of the rope.

In another exemplary aspect according to the above-referenced embodiment, the sewn connection further may further include a border stitch surrounding the zig-zag stitch.

In another exemplary aspect according to the above-referenced embodiment, the first end binding may be offset from the main loop binding by between about one-eighth and about one-fourth of the length of the rope.

In another exemplary aspect according to the above-referenced embodiment, each of the first end loop and the second end loop may have a loop length between about 6 inches and 24 inches.

In another exemplary aspect according to the above-referenced embodiment, the utility rope apparatus may further include a first sleeve and a second sleeve. The first sleeve may be configured to cover a majority of the first end loop and the second sleeve may be configured to cover a majority of the second end loop.

In another exemplary aspect according to the above-referenced embodiment, a diameter of the rope may be less than or equal to 1 inch.

In another exemplary aspect according to the above-referenced embodiment, the rope may be a double braided rope.

In another exemplary aspect according to the above-referenced embodiment, the first end binding may be coupled between first and second points of the main loop of the rope, and the second end binding may be coupled between third and fourth points of the main loop of the rope. The first end binding may be configured to enable the first and second points to move less than or equal to 1 inch relative to one another. The second binding may be configured to enable the third and fourth points to move less than or equal to 1 inch relative to one another. This may enable the splice or sewing (i.e., the main loop binding) to be positioned outside of the first and second end loop areas to thus further increase strength.

In another exemplary aspect according to the above-referenced embodiment, each of the first and second end bindings comprise a sewn binding.

In another exemplary aspect according to the above-referenced embodiment, the first end loop may be configured to be coupled to the first object and the second end loop may be configured to be coupled to the second object. In accordance with this aspect, a pulling strength of the utility rope apparatus may be at least twice that of the rope.

In another exemplary aspect according to the above-referenced embodiment, both the first and second end loops may be configured to be coupled to the first object, and first portion of the rope defined between the first and second end loops may be configured to be coupled to the second object. In accordance with this aspect, a pulling strength of the utility rope apparatus may be at least four times that of the rope.

In another embodiment, an exemplary method of coupling first and second rope portions of a rope together, as disclosed herein, may comprise (a) positioning the first and second portions of the rope next to each other, and (b) sewing the first and second portions of the rope to define a sewn connection. The sewn connection may have sewn length of at least eight times a diameter of the rope.

In an exemplary aspect according to the above-referenced embodiment, the sewn connection may overlap at least half of the diameter of each of the first and second portions of the rope.

In another exemplary aspect according to the above-referenced embodiment, the method may further include sewing a border stitch around the sewn connection along each of the first and second portions of the rope.

In another exemplary aspect according to the above-referenced embodiment, at least one of the first or second portions of the rope may include an end of the rope.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
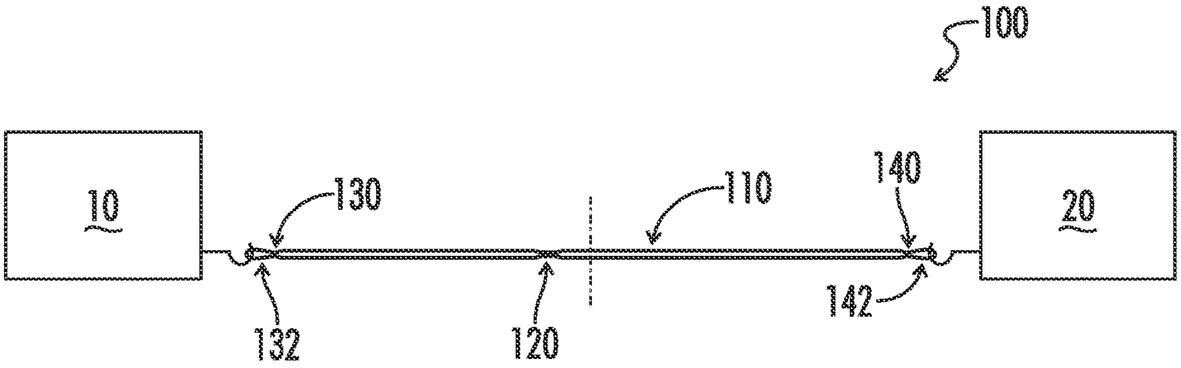
FIG. 1 is a side elevation view of an embodiment of a utility rope apparatus positioned between first and second objects for pulling in accordance with the present disclosure.
Figure 2:
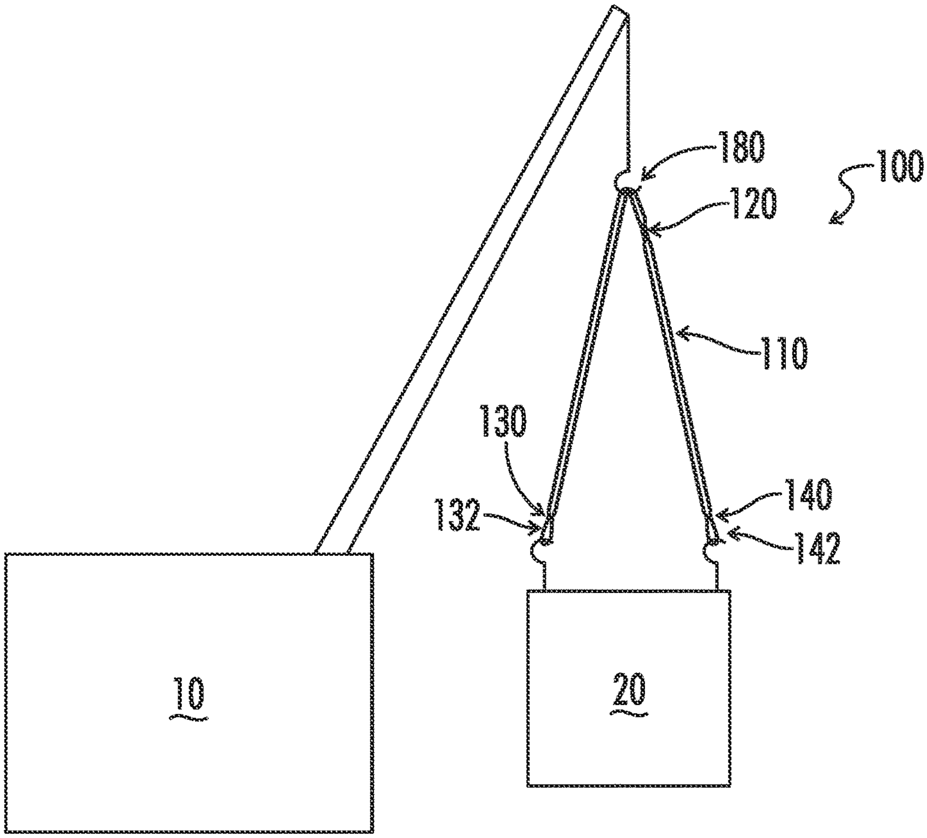
FIG. 2 is a side elevation view of the utility rope apparatus of FIG. 1 positioned between first and second objects for lifting in accordance with the present disclosure.
Figure 7:
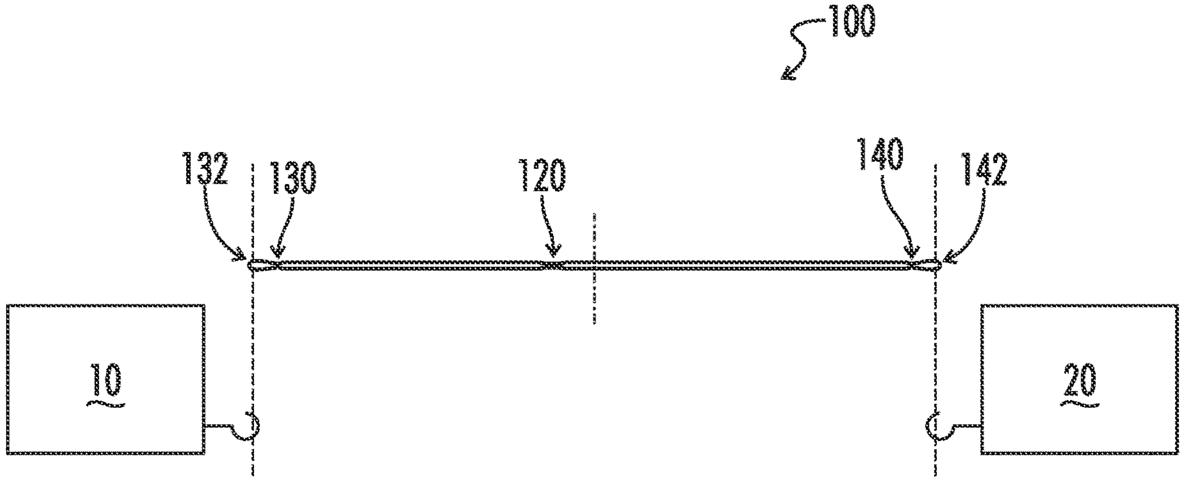
FIG. 7 is an exploded side elevation view of the utility rope apparatus of FIG. 1 between the first and second objects in accordance with the present disclosure.

Referring to FIGS. 1, 2, and 7, a utility rope apparatus 100 of the present disclosure is shown coupled between a first object 10 and a second object 20. In certain optional embodiments, the utility rope apparatus 100 may be utilized for pulling the second object 20 with the first object 10, such as, for example, pulling a stuck vehicle with a recovery vehicle. Accordingly, the utility rope apparatus 100 is useful as a recovery rope or a tow rope. In other optional embodiments, the utility rope apparatus 100 may be used for lifting the second object 20 with the first object 10, such as, for example, lifting the second object 20 using a crane or other lifting apparatus. As such, the utility rope apparatus 100 may be useful as a recovery rope, a tow rope, a lifting rope, sling, or the like. The possibilities enabled thereby are limitless.

The utility rope apparatus 100 may comprise a rope 110, a main loop binding 120, a first end binding 130, and a second end binding 140. The rope 110, as shown unbound in FIG. 12, may include a first end 112, a second end 114, and a length 116 defined between the first and second ends 112, 114. The length 116 may be between about 10 ft and 100 ft, however, in certain optional embodiments, the length of the rope 110 may be longer or shorter in order to provide, for example, certain looping capabilities, as shown in FIGS. 8-11, or be customized base on a customers requirements. In certain optional embodiments, the rope 110 may be a double braided nylon rope. In other optional embodiments, the rope 110 of the utility rope apparatus 100 may be formed from other types of rope, such as, for example, double braided polyester, polyester over a nylon core, or the like.

Figure 3A:
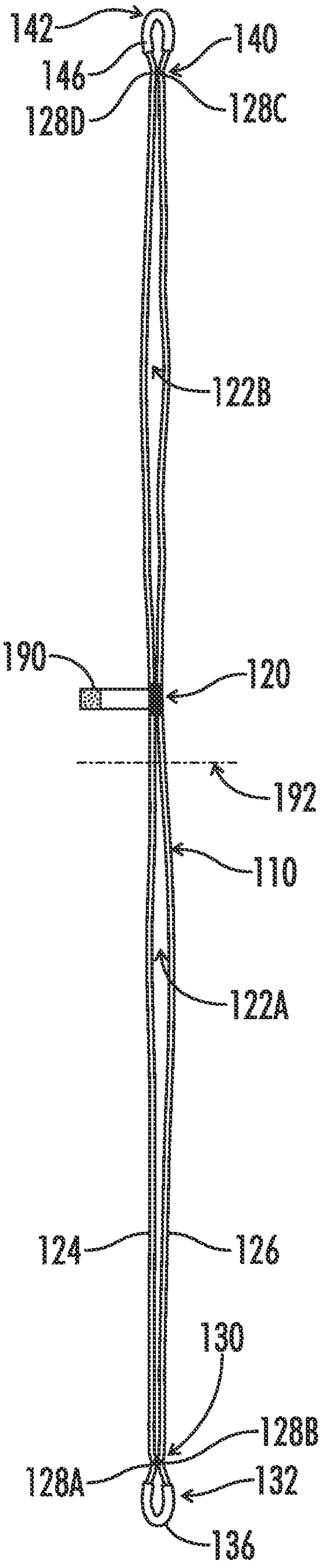
FIG. 3A is a top plan view of the utility rope apparatus of FIG. 1 in accordance with the present disclosure.
Figure 3B:
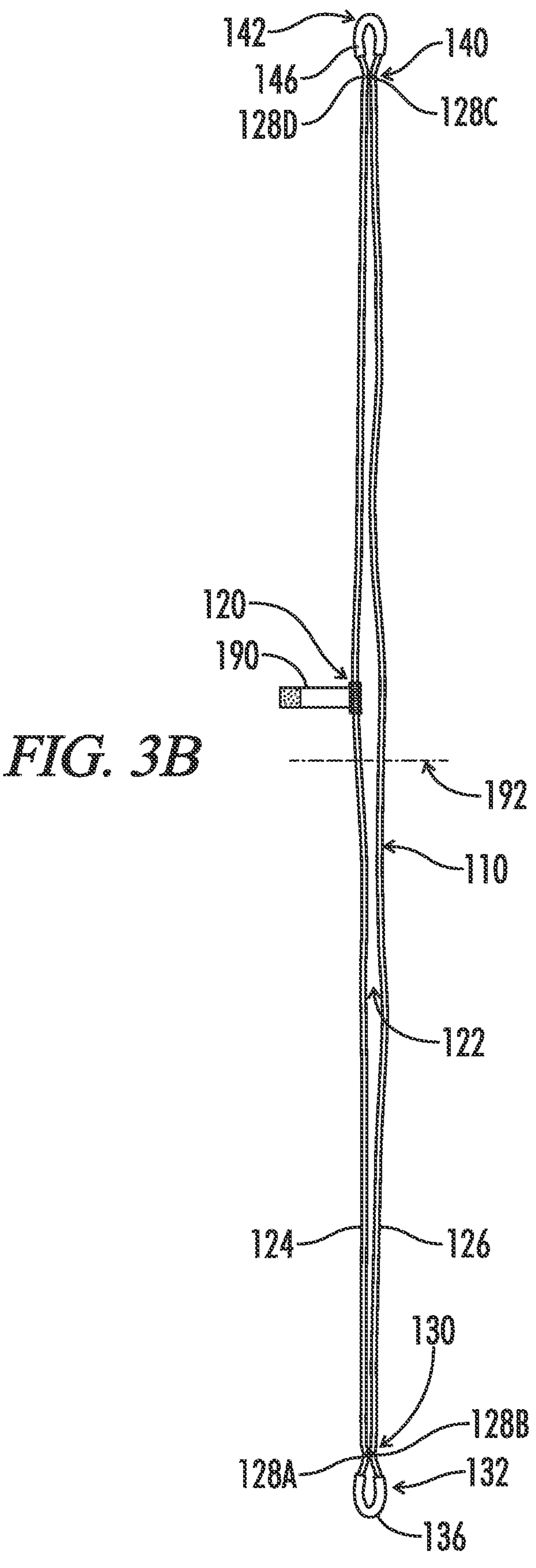
FIG. 3B is a top plan view of the utility rope apparatus of FIG. 3A with first and second strands separated in accordance with the present disclosure.

The main loop binding 120 may be configured to couple the first and second ends 112, 114 (shown in FIGS. 4A and 5) of the rope 110 together to define a main loop 122 of the rope 110, shown in FIG. 3B. The first end binding 130 may be coupled to the main loop 122 of the rope 110 to define a first end loop 132. The first end loop 132 may be subdivided from the main loop 122. The second end binding 140 may be coupled to the main loop 122 of the rope 110 to define a second end loop 142. The second end loop 142 may be subdivided from the main loop 122 and offset from the first end loop by about one-half the length 116 of the rope 110.

The main loop 122 may include a first strand 124 and a second strand 126 extending parallel to one another between the first end binding 130 and second end binding 140. The first strand 124 may also be referred to herein as a first leg 124 and the second strand 126 may also be referred to herein as a second leg 126. The main loop binding 120 may be coupled to or defined along one of the first or second strands 124, 126. As illustrated, the main loop binding 120 is defined along the first strand 124. In certain optional embodiments, the main loop binding 120, in addition to coupling the first and second ends 112, 114 of the rope 110, may also snugly couple the first and second strands 124, 126 together, as shown in FIG. 4B.

Figure 4A:
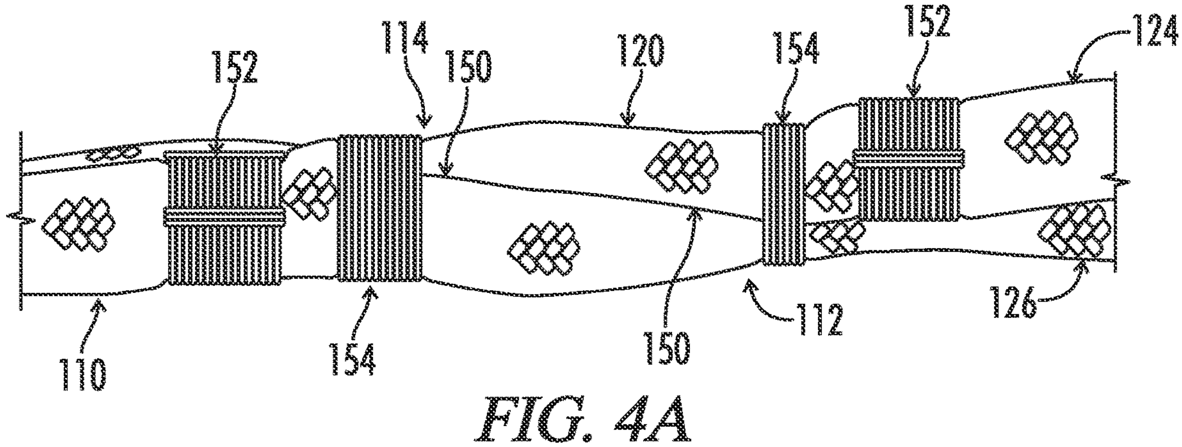
FIG. 4A is an enlarged top plan view of an embodiment of a main loop binding of the utility rope apparatus of FIG. 1 in accordance with the present disclosure.
Figure 4B:
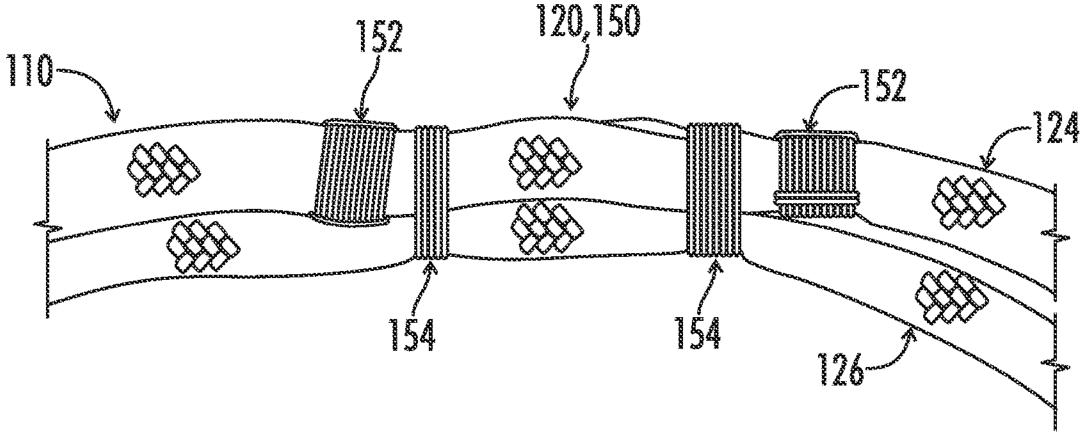
FIG. 4B is an enlarged side elevation view of the main loop binding of FIG. 4A in accordance with the present disclosure.

Referring to FIGS. 4A and 4B, the main loop binding 120 may comprise a spliced connection 150. The spliced connection 150 may be defined by splicing the first and second ends 112, 114 of the rope 110 together. The spliced connection 150 may be formed as an "end-for-end splice" using techniques know to those skilled in the art. The spliced connection 150 may include threaded lock 152 sewn into the spliced connection 150 to lock said spliced connection 150.

Figure 4C:
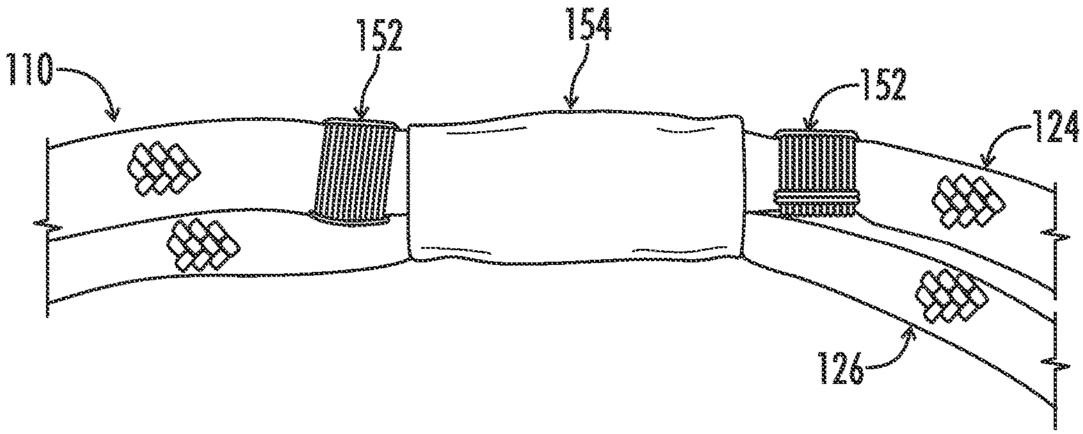
FIG. 4C is an enlarged side elevation view of an embodiment of the main loop binding of FIG. 4B with a shrink tubing applied thereon in accordance with the present disclosure.

As previously discussed, the main loop binding 120, as shown in FIG. 4B, may include at least one additional binding 154 connecting the first strand 124 and the second strand 126. The additional binding 154 may fix the position of the first and second strands 124, 126 relative to one another. As such, the additional binding 154 may also help fix the positions of the first and second end loops 132, 142. Incidentally, the additional binding 154 may further subdivide the main loop 122 into first and second main loops 122A, 122B, shown in FIG. 3A. The additional binding 154 may further help the utility rope apparatus 100 balance an applied tension evenly between the first and second strands 124, 126 to maximize the strength of the utility rope apparatus 100. The additional binding 154 may, for example, be a threaded binding (shown in FIGS. 4A-4B) sewn between the first strand 124 and the second strand 126. In certain alternate embodiments, the additional binding 154 may be a shrink tubing (shown in FIG. 4C) for achieving the same results as the threaded binding, which may or may not cover the threaded lock 152. In other alternate embodiments, the additional binding 154 may include both a threaded binding and a shrink tubing.

Figure 5:
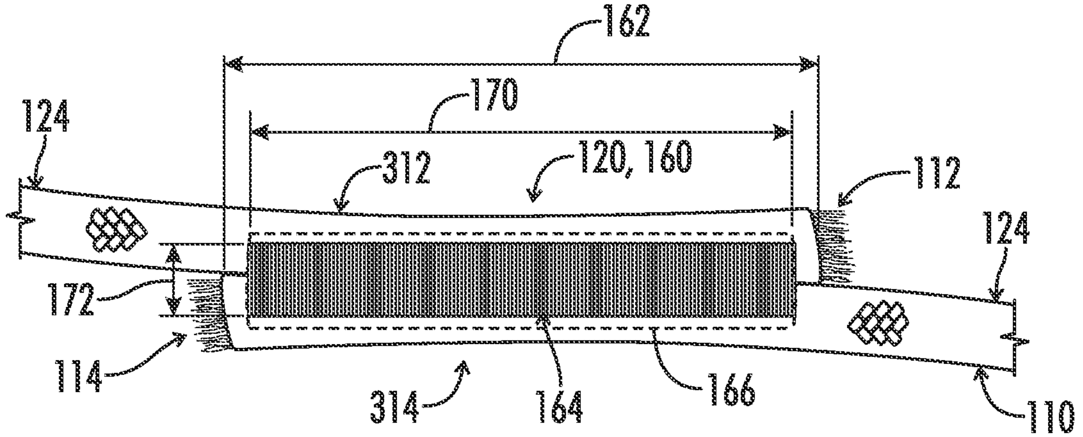
FIG. 5 is an enlarged top plan view of another embodiment of a main binding of the utility rope apparatus of FIG. 1 in accordance with the present disclosure.

Referring to FIG. 5, the main loop binding 120 may be defined by a sewn connection 160. In accordance with this embodiment, the first and second ends 112, 114 of the rope 110 may be overlapped by an overlap length 162. The sewn connection 160 may be sewn between the first and second ends 112, 114 of the rope 110 along a majority of the overlap length 162. The sewn connection 160 may comprise a zig-zag stitch 164. The zig-zag stitch 164 may have a very short length between each zig-zag and may also be referred to herein as a satin stitch. The sewn connection 160 of the main loop binding 120 may further include a border stitch 166. The border stitch 166 may surround the zig-zag stitch 164 and in certain optional embodiments be offset from the zig-zag stitch 164. The border stitch 166 may be applied before the zig-zag stitch 164 or after the zig-zag stitch 164.

The zig-zag stitch 164 may include a total sewn length 170 of greater than or equal to eight (8) times a diameter 118 of the rope 110. This ensures that the connection between the first and second ends 112, 114 of the rope 110 are stronger than the rope 110 itself. In certain optional embodiments, the total sewn length 170 may be less than eight (8) times the diameter 118 of the rope 110, for example, when the diameter 118 is very small.

The diameter 118 of the rope 110 may be any size, however, due to the ability to fold the utility rope apparatus 100 over multiple times between the first and second objects 10, 20, the diameter 118 of the rope 110 may generally be less than or equal to one (1) inch. In other optional embodiments, the diameter 118 of the rope 110 may be larger than one (1) inch.

The zig-zag stitch 164 may further include a sewn width 172 greater than or equal to the diameter 118 of the rope 110. This may ensure that there is enough overlap between the zig-zag stitch 164 and the inner portion of the rope 110 to provide proper strength profiles to the utility rope apparatus 100. In certain optional embodiments, the sewn width 172 may be at least 90% of the diameter 118 of the rope 110. In other optional embodiments, the sewn width 172 may be at least 75% of the diameter 118 of the rope 110.

The sewn connection 160 of the utility rope apparatus 100 may provide additional manufacturing benefits. Stitching the first and second ends 112, 114 of the rope 110 together in lieu of a splice reduces the amount of rope needed to make the connection (e.g., the main loop binding 120). Sewing the rope also reducing the manufacturing time as it reducing labor by eliminating the whipping around the splice. Also, sewing the connection (e.g., the main loop binding 120) by machine is much faster than creating a splice in the rope 110. The new design of the utility rope apparatus 100 is accomplished using a smaller diameter rope. This allows a manufacturer to sew any size of rope 110 of the utility rope apparatus 100 using sewing machines that are currently on sale in the marketplace. Sewing the connection (e.g., the main loop binding 120) further reduces labor costs due to a lower skill requirement. Sewing the connection (e.g., the main loop binding 120) also reduces the chance of human error in making the splice as it is a complicated process.

The first end binding 130 may be offset from the main loop binding 120 by between one-eighth (⅛) of the length 116 of the rope 110 and about one-fourth (¼) of the length 116 of the rope 110. By being offset from a central division line 192 (shown in FIGS. 3A-3B) defined midway between the first and second end loops 132, 142, engagement of the main loop binding 120 upon one of the first or second objects 10, 20 may be avoided. The central division line 192 may also be referred to herein as a middle division line 192. Engagement of the main loop binding by one of the first or second objects 10, 20 (e.g., folded-over for used as engagement point) cause failure of the main loop binding 120 and thus failing of the utility rope apparatus 100. In other optional embodiments, the main loop binding 120 may be positioned at the central division line 192 defined midway between the first and second end loops 132, 142. In other optional embodiments, the second end binding 140 may be offset from the main loop binding 120 by between one-eighth (⅛) of the length 116 of the rope 110 and about one-fourth (¼) of the length 116 of the rope 110. The position of the main loop binding 120 may be fixed using the first and second end bindings 130, 140.

Figure 6:
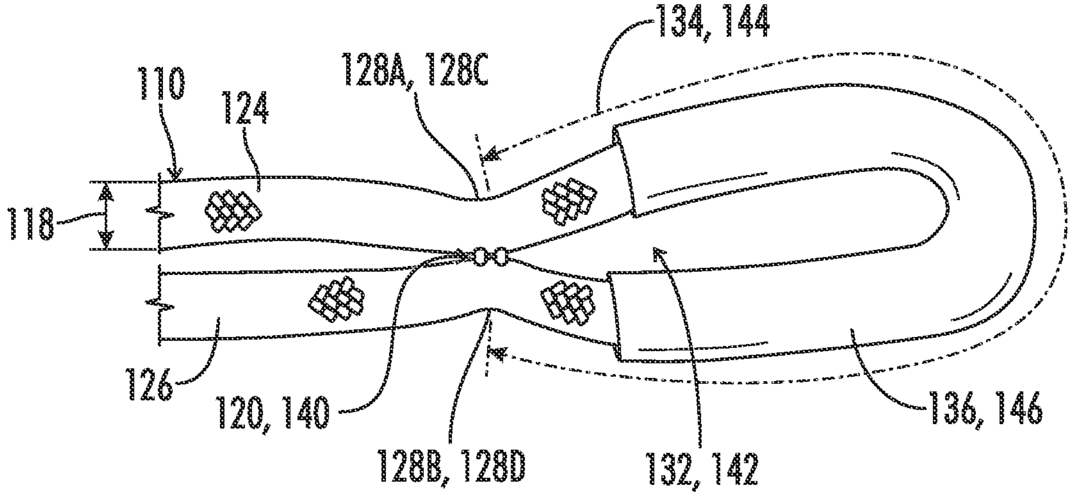
FIG. 6 is an enlarged top plan view of an end loop of the utility rope apparatus of FIG. 1 in accordance with the present disclosure.

Referring to FIG. 6, each of the first and second end loops 132, 142 may include a loop length 134, 144, respectively, between about 6 inches and about 24 inches. In certain alternate embodiments, the loop lengths 134, 144 of the first and second end loops 132, 142 may be smaller than 6 inches or larger than 24 inches depending upon customer and/or job specific requirements. The utility rope apparatus 100 may further include a first sleeve 136 configured be received by the first end loop 132 and a second sleeve 146 configured to be received by the second end loop 142. The first sleeve 136 may cover a majority of the first end loop 132 and may also be at least ten percent (10%) shorter than the loop length 134. The second sleeve 146 may cover a majority of the second end loop 142 and may also be at least ten percent (10%) shorter than the loop length 144.

The first and second sleeves 136, 146 may be used to cover areas a customer may connect a shackle to. Accordingly, the first and second sleeves 136, 146 protect the areas from wear and tear while also indicating where to connect the shackle, thus also preventing misuse of the utility rope apparatus 100. The utility rope apparatus 100 uses a smaller diameter rope to provide a greater or equivalent strength to that of larger diameter single strand rope. The smaller diameter of the rope 110 in this design allows for the use of a smaller diameter sleeve (e.g., the first and second sleeves 136, 146). This may greatly reduce the sizes of the sleeve (e.g., to those commonly stocked by manufacturers), making it easier for production, while reducing inventory, reducing inventory costs, and reducing complexity on the shop floor and most importantly reducing costs.

Referring to FIGS. 3A and 3B, the first end binding 130 may be coupled between first and second points 128A, 128B of the main loop 122 of the rope 110. The second end binding 140 may be coupled between third and fourth points 128C, 128D of the main loop 122 of the rope 110. The first end binding 130 may be configured to enable the first and second points 128A, 128B of the main loop 122 to move relative to one another. Similarly, the second end binding 140 may be configured to enable the third and fourth points 128C, 128D of the main loop 122 to move relative to one another. This allows the rope 110 to balance the tension between all strands (e.g., the first and second strands 124, 126) in order to maximize the strength of the rope 110, while also maintaining the positions of the first and second sleeves 136, 146 for protecting the rope 110 from abrasion.

In certain optional embodiments, the first end binding 130 may be configured to enable the first and second points 128A, 128B of the main loop 122 to move less than or equal to one (1) inch relative to one another, and the second end binding 140 may be configured to enable the third and fourth points 128C, 128D of the main loop 122 to move less than or equal to 1 inch relative to one another. In other optional embodiments, the enabled movement may be greater than one (1) inch.

In certain optional embodiments, each of the first and second end bindings 130, 140 may comprise a sewn binding. The sewn binding may include slack between the first and second points 128A, 128B or the third and fourth points 128C, 128D, respectively, in order to allow partial movement between said points of the main loop 122. In other optional embodiments, each of the first and second end bindings 130, 140 may alternatively be formed via a metal or synthetic binding configured to allow partial movement between the aforementioned points.

Referring to FIGS. 7-11, several embodiments of different looping configurations of the utility rope apparatus 100 between the first and second objects 10, 20 are shown. As illustrated in FIG. 7, the first end loop 132 may be configured to be coupled to the first object 10 and the second end loop may be configured to be coupled to the second object 20. The pulling strength of the utility rope apparatus 100 as configured in FIG. 7 may be at least twice that of the rope 110 in a single strand configuration.

Figure 8:
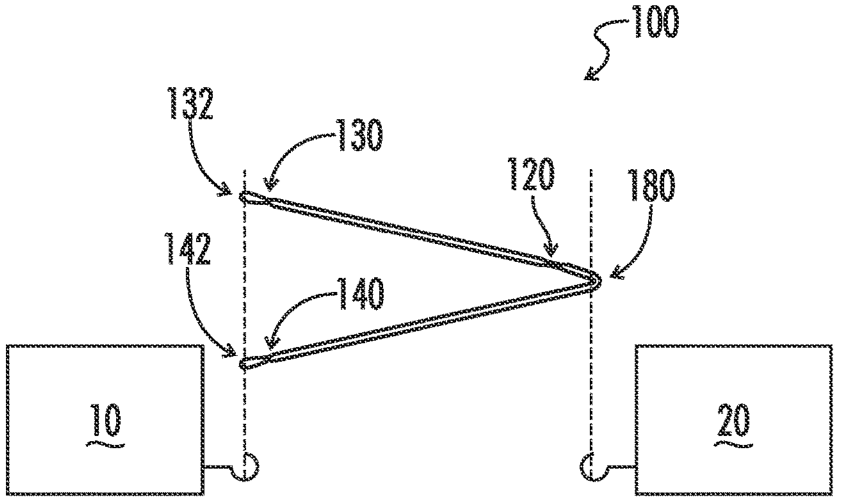
FIG. 8 is an exploded side elevation view of the utility rope apparatus of FIG. 1 looped once between the first and second objects in accordance with the present disclosure.

As illustrated in FIG. 8, both the first and second end loops 132, 142 may be configured to be coupled to the first object 10. In accordance with this embodiment, a first portion 180 of the main loop 122 defined between the first and second end loops 132, 142 may be configured to be coupled (or looped) to the second object 20. The pulling strength of the utility rope apparatus 100 as configured in FIG. 8 may be at least four-times that of the rope 110 in a single strand configuration.

Figure 9:
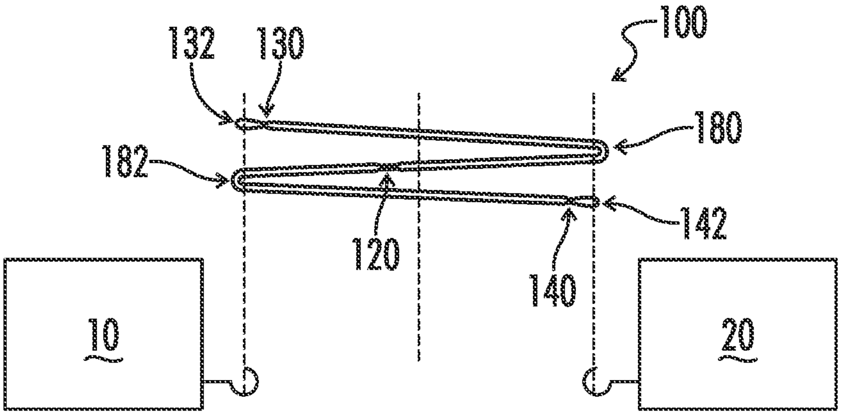
FIG. 9 is an exploded side elevation view of the utility rope apparatus of FIG. 1 between looped twice the first and second objects in accordance with the present disclosure.

As illustrated in FIG. 9, the first end loop 132 may be configured to be coupled to the first object 10 and the second end loop may be configured to be coupled to the second object 20. In accordance with this embodiment, the first portion 180 of the main loop 122 may be configured to be coupled (or looped) to the second object 20. Further in accordance with this embodiment, a second portion 182 of the main loop 122 defined between the first and second end loops 132, 142 may be configured to be coupled (or looped) to the second object 10. The second portion 182 may further be positioned between the first portion 180 and the second end loop 142. The pulling strength of the utility rope apparatus 100 as configured in FIG. 9 may be at least six-times that of the rope 110 in a single strand configuration.

Figure 10:
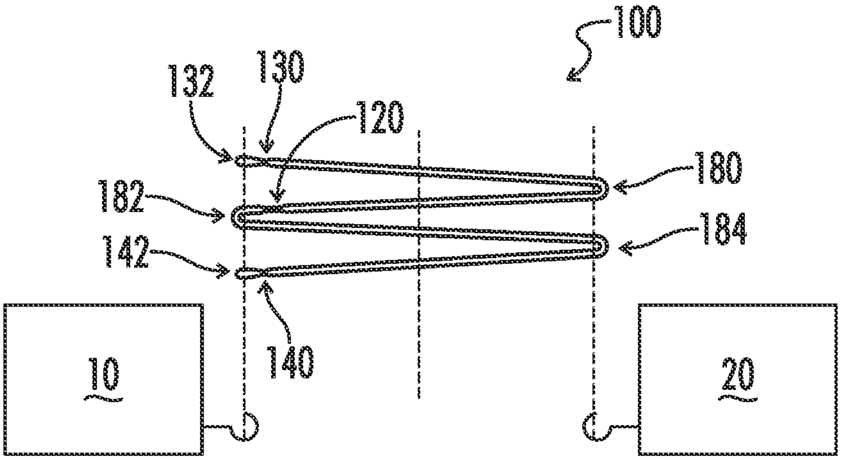
FIG. 10 is an exploded side elevation view of the utility rope apparatus of FIG. 1 looped three times between the first and second objects in accordance with the present disclosure.

As illustrated in FIG. 10, both the first and second end loops 132, 142 may be configured to be coupled to the first object 10. In accordance with this embodiment, the first portion 180 of the main loop 122 may be configured to be coupled to the second object 20 and the second portion 182 of the main loop 122 may be configured to be coupled to the first object 10. Further in accordance with this embodiment, a third portion 184 of the main loop 122 defined between the first and second end loops 132, 142 may be configured to be coupled to the second object 20. The third portion 184 may further be positioned between the second portion 182 and the second end loop 142. The pulling strength of the utility rope apparatus 100 as configured in FIG. 10 may be at least eight-times that of the rope 110 in a single strand configuration.

Figure 11:
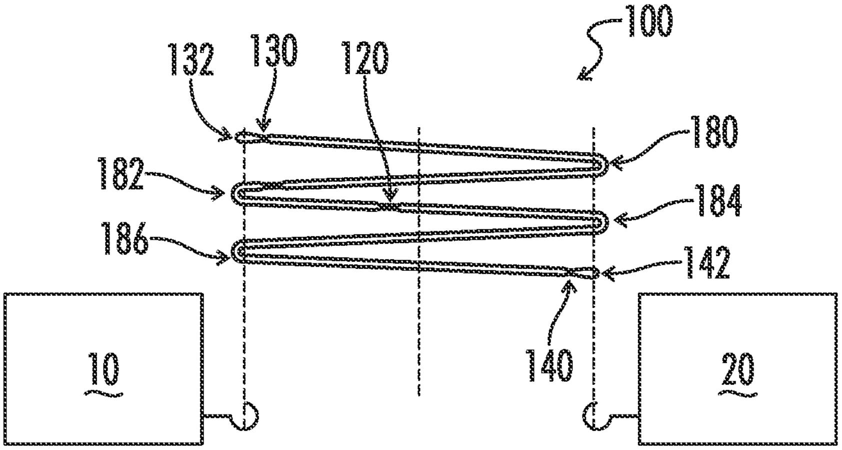
FIG. 11 is an exploded side elevation view of the utility rope apparatus of FIG. 1 looped four times between the first and second objects in accordance with the present disclosure.
Figure 12:
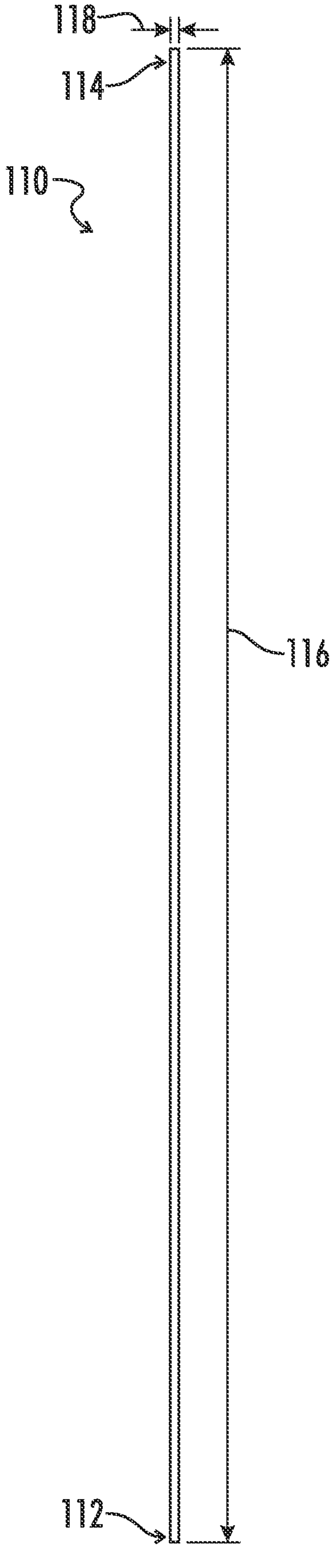
FIG. 12 is a top plan view of a rope of the utility rope apparatus of FIG. 1 in accordance with the present disclosure.

As illustrated in FIG. 11, the first end loop 132 may be configured to be coupled to the first object 10 and the second end loop may be configured to be coupled to the second object 20. In accordance with this embodiment, the first portion 180 of the main loop 122 may be configured to be coupled to the second object 20, the second portion 182 of the main loop 122 may be configured to be coupled to the first object 10, and the third portion 184 of the main loop 122 may be configured to be coupled to the second object 20. Further in accordance with this embodiment, a fourth portion 186 of the main loop 122 defined between the first and second end loops 132, 142 may be configured to be coupled to the first object 10. The fourth portion 186 may further be positioned between the third portion 184 and the second end loop 142. The pulling strength of the utility rope apparatus 100 as configured in FIG. 11 may be at least ten-times that of the rope 110 in a single strand configuration.

In accordance with the previous description of FIGS. 7-11, additional loops of the utility rope apparatus 100 between the first and second objects 10, 20 may increase the strength thereof.

Referring to FIGS. 3A and 3B, the utility rope apparatus 100 may further include a VELCRO® strap 190 coupled to the main loop binding 120. The VELCRO® strap 190 may provide a convenient way to wrap and store the utility rope apparatus 100 when not in use. In other optional embodiments, the VELCRO® strap 190 may be coupled along the rope 110 in a location other than at the main loop binding 120. As further illustrated in FIGS. 3A-3B, the central division line 192 is illustrated as equidistant between the first and second end loops 132, 142.

Figure 13:
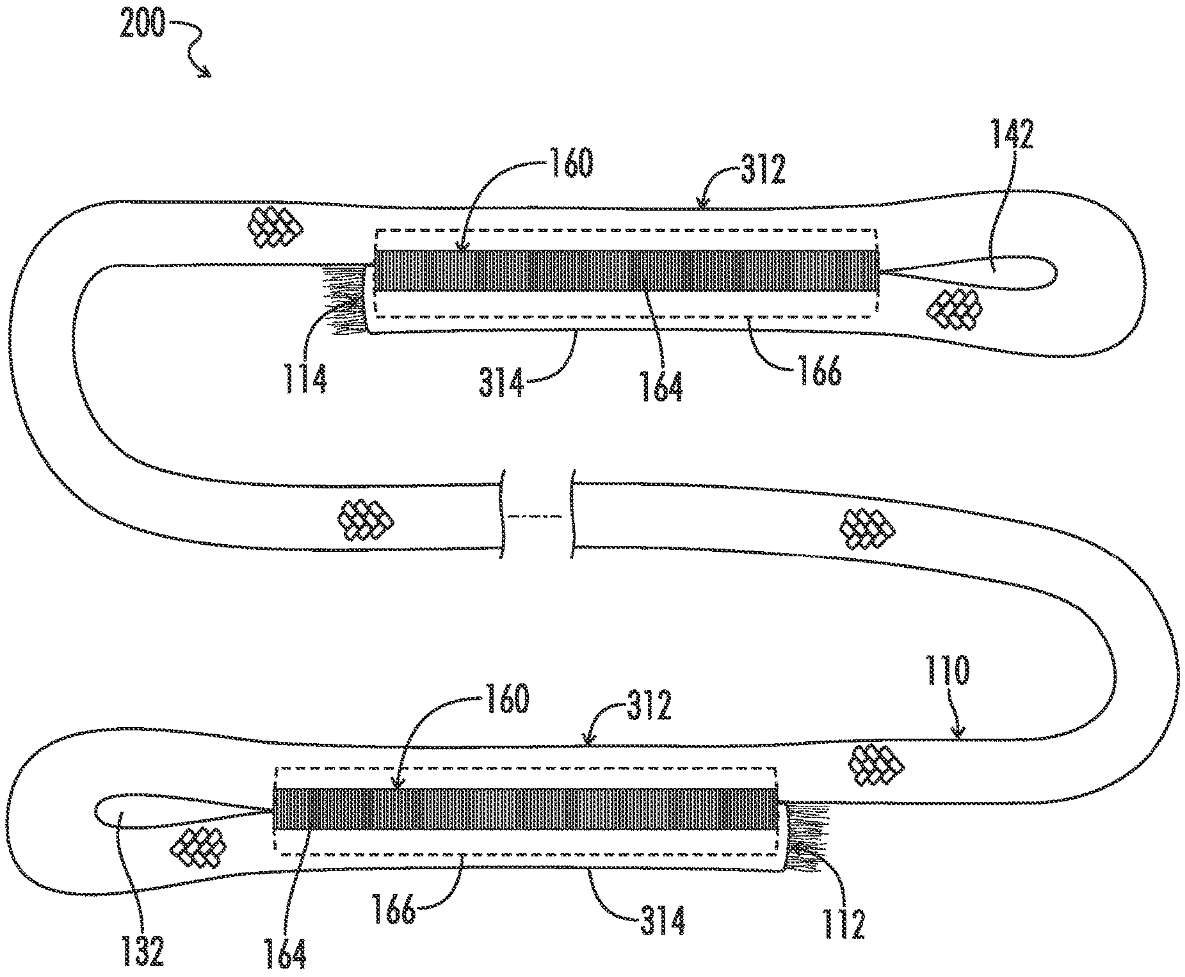
FIG. 13 is a top plan view of another embodiment of a utility rope apparatus in accordance with the present disclosure.

Referring to FIG. 13, an alternate embodiment of a utility rope apparatus 200 is illustrated. Similar elements of the utility rope apparatus 200 may be numbered and function similar to those of the utility rope apparatus 100, as described above. The first end loop 132 of the utility rope apparatus 200 may be formed using the first end 112 of the rope 110 and a sewn connection 160. The second end loop 142 of the utility rope apparatus 200 may be formed using the second end 114 of the rope 110 and a sewn connection 160. In accordance with this embodiment, a single strand of the rope 110 may extend between the first and second end loops 132, 142 of the utility rope apparatus 200.

Figure 14:
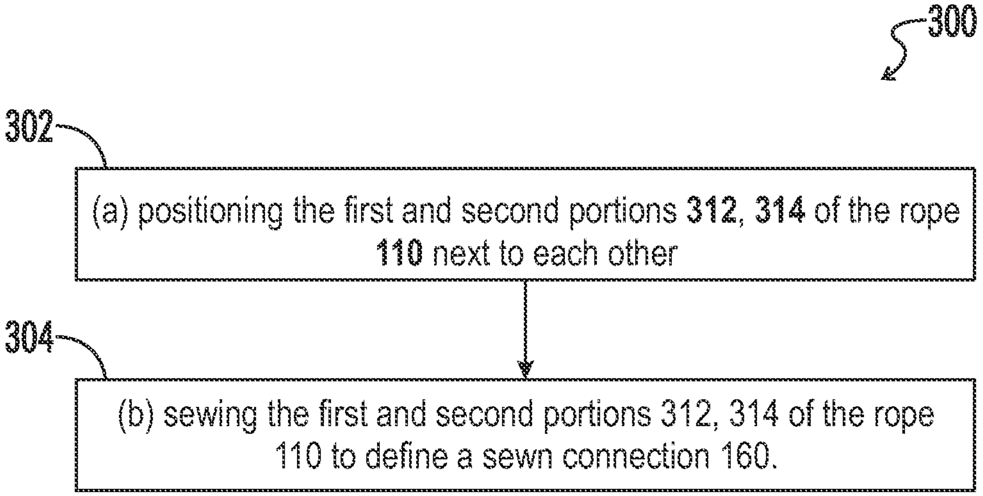
FIG. 14 is method of coupling first and second rope portions of a rope together in accordance with the present disclosure.

Referring to FIG. 14, a method 300 of coupling first and second rope portions 312, 314 of the rope 110 together. At least one of the first or second rope portions 312, 314 may comprise an end portion of the rope 110 (e.g., one of the first or second ends 112, 114). The utility rope apparatus 100 may be defined when the first and second rope portions 312, 314 comprise the first and second ends 112, 114 of the rope 110.

The method 300 may comprise (a) positioning 302 the first and second rope portions 312, 314 of the rope 110 next to each other. The method 300 may further comprise (b) sewing 304 the first and second rope portions 312, 314 of the rope 110 to define a sewn connection 160. The sewn connection 160 may have a sewn length 170 of at least eight times a diameter 118 of the rope 110. The sewn connection 160 may also overlap at last half of the diameter 118 of each of the first and second rope portions 312, 314 of the rope 110.

The method 300 may further comprise sewing a border stitch 166 around the sewn connection 160, specifically, the zig-zag stitch 164, along each of the first and second rope portions 312, 314 of the rope 110.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. A utility rope apparatus configured to be coupled between first and second objects for pulling or lifting, the utility rope apparatus comprising:

a rope having a first end, a second end, and a length defined between the first and second ends;

a main loop binding configured to couple the first and second ends of the rope together to define a main loop of the rope;

a first end binding coupled to the main loop of the rope to define a first end loop, the first end loop subdivided from the main loop;

a second end binding coupled to the main loop of the rope to define a second end loop, the second end loop subdivided from the main loop and offset from the first end loop by about one-half of the length of the rope; and wherein the first and second ends of the rope are overlapped by an overlap length; and wherein the main loop binding is defined by a sewn connection between the first and second ends of the rope along a majority of the overlap length.

2. The utility rope apparatus of claim 1, wherein:

the main loop binding comprises a spliced connection defined by splicing the first and second ends of the rope together.

3. The utility rope apparatus of claim 1, wherein:

the sewn connection comprises a zig-zag stitch.

4. The utility rope apparatus of claim 3, wherein:

the zig-zag stitch includes a total sewn length greater than or equal to 8 times a diameter of the rope.

5. The utility rope apparatus of claim 3, wherein:

the zig-zag stitch includes a sewn width greater than or equal to a diameter of the rope.

6. The utility rope apparatus of claim 3, wherein:

the sewn connection further includes a border stitch surrounding the zig-zag stitch.

7. The utility rope apparatus of claim 1, wherein:

the first end binding is offset from the main loop binding by between about one-eighth and about one-fourth of the length of the rope.

8. The utility rope apparatus of claim 1, wherein:

each of the first end loop and the second end loop have a loop length between about 6 inches and 24 inches.

9. The utility rope apparatus of claim 1, further comprising:

a first sleeve configured to cover a majority of the first end loop and a second sleeve configured to cover a majority of the second end loop.

10. The utility rope apparatus of claim 1, wherein:

a diameter of the rope is less than or equal to 1 inch.

11. The utility rope apparatus of claim 1, wherein:

the rope is a double braided rope.

12. The utility rope apparatus of claim 1, wherein:

the first end binding is coupled between first and second points of the main loop of the rope, the first end binding configured to enable the first and second points to move less than or equal to 1 inch relative to one another; and the second end binding is coupled between third and fourth points of the main loop of the rope, the second end binding configured to enable the third and fourth points to move less than or equal to 1 inch relative to one another.

13. The utility rope apparatus of claim 1, wherein:

each of the first and second end bindings comprise a sewn binding.

14. The utility rope apparatus of claim 1, wherein:

the first end loop is configured to be coupled to the first object and the second end loop is configured to be coupled to the second object; and a pulling strength of the utility rope apparatus is at least twice that of the rope.

15. The utility rope apparatus of claim 1, wherein:

both the first and second end loops are configured to be coupled to the first object; a first portion of the rope defined between the first and second end loops is configured to be coupled to the second object; and a pulling strength of the utility rope apparatus is at least four times that of the rope.

16. A method of coupling first and second rope portions of a rope together, the method comprising:

(a) positioning the first rope portion next to the second rope portion such that the first and second rope portions are overlapped by an overlap length; and (b) sewing the first and second rope portions together to define a sewn connection extending along a majority of the overlap length, the sewn connection having a sewn length of at least eight times a diameter of the rope.

17. The method of claim 16, wherein:

the sewn connection overlaps at least half of the diameter of each of the first and second rope portions.

18. The method of claim 16, further comprising:

sewing a border stitch around the sewn connection along each of the first and second rope portions.

19. The method of claim 16, wherein:

at least one of the first or second rope portions includes an end of the rope.

* * * * *